Nov. 23, 1948.  G. T. McCLURE ET AL  2,454,469
CONTROL VALVE DEVICE
Filed March 9, 1946  2 Sheets-Sheet 1

INVENTORS
Glenn T. McClure
John W. Rush
BY
ATTORNEY

Nov. 23, 1948.  G. T. McCLURE ET AL  2,454,469
CONTROL VALVE DEVICE

Filed March 9, 1946  2 Sheets-Sheet 2

Fig. 3

INVENTORS
Glenn T. McClure
John W. Rush
BY
ATTORNEY

Patented Nov. 23, 1948

2,454,469

UNITED STATES PATENT OFFICE 2,454,469

CONTROL VALVE DEVICE

Glenn T. McClure and John W. Rush, Wilkinsburg, Pa., assignors to The Westinghouse Air Brake Company, Wilmerding, Pa., a corporation of Pennsylvania Application March 9, 1946, Serial No. 653,329

8 Claims. (Cl. 303—69)

This invention relates to control valve devices and has particular relation to control valve devices of the type adapted especially for use in fluid pressure brake control systems on railway cars and trains for controlling the release of fluid under pressure from the brake cylinder and the subsequent resupply of fluid under pressure to the brake cylinder upon the occurrence of a slipping condition of the wheels for the purpose of preventing the sliding of the car wheels.

In heretofore known control valve devices of the type employed for effecting the release of fluid under pressure from a brake cylinder and the subsequent resupply of fluid under pressure to the brake cylinder in response to the occurrence of a slipping condition of the wheels, for example, that shown and described in Patent 2,366,044 to Joseph C. McCune, assigned to the assignee of this application, the reduction of brake cylinder pressure is automatically continued once it is initiated until the pressure in the brake cylinder reduces to a certain low value, the valve device then being conditioned to be restored automatically to the position for resupplying fluid under pressure to the brake cylinder and thereby reapplying the brakes.

It is an object of our present invention to provide a control valve device of the type referred to above, characterized by a novel arrangement for controlling the reduction of the brake cylinder pressure on a time basis independently of the value to which the pressure in the brake cylinder is reduced.

In the control valve device of Patent 2,366,044, operation of the valve device is initiated through a pneumatic connection in response to the operation of a so-called "Decelostat," a device carried in a casing attached to the outer end of the journal of a wheel axle and operatively responsive to the occurrence of a slipping condition of the vehicle wheel. Whenever a slipping condition of the wheels is induced by reason of an excessive brake application, a pilot valve included in the "Decelostat" is operated to effect a reduction of the pressure in a control chamber of the control valve device, thereby to initiate the sequence of operation of the control valve device to effect a rapid release of fluid under pressure from the brake cylinder and the subsequent resupply of fluid under pressure to the brake cylinder.

The so-called pilot valve pipe connecting the "Decelostat" and the control valve device is a flexible armored conduit or pipe which is subject to possible breakage or rupture due to striking an external object or due to ballast thrown up against the pipe during the travel of the train.

If the pilot valve pipe is broken or if the "Decelostat" pilot valve "sticks" in open position and fails to reclose promptly during a brake application, the control valve device is operated responsively to effect a release of fluid under pressure from the brake cylinder, which release is continued throughout the remainder of the brake application unless suitable means is provided for insuring restoration of the supply of fluid under pressure to the brake cylinder.

In order to guard against the undesirable failure of a brake application caused by breakage of a "Decelostat" pilot valve pipe or the sticking open of the "Decelostat" pilot valve during a brake application, it has been proposed to provide a control valve device which functions automatically to insure the operation of the control valve device to a normal position restoring the supply of fluid under pressure to the brake cylinder in such event. Such a control valve device is shown, described and claimed in Patent No. 2,417,209 to Joseph C. McCune, assigned to the assignee of this application.

It is a further object of our invention to provide a control valve device of the type referred to herein, characterized by an arrangement which functions in a dual capacity to control the reduction of brake cylinder pressure on a time basis and to insure the resupply of fluid under pressure to the brake cylinder in the event of breakage of the pilot valve pipe or sticking open of the "Decelostat" pilot valve during a brake application.

The above objects, and other objects of our invention which will be made apparent herein, are attained by several embodiments described in detail hereinafter and shown in the accompanying drawings, wherein.

Description

It should be understood that our control valve device may be employed in various situations or types of mechanisms other than brake control apparatus. It is, however, particularly designed for and useful in connection with fluid pressure brake control systems for railway cars and trains and will therefore be described, by way of illustration, in connection with a fluid pressure brake control apparatus for railway cars and trains.

Figure 1:
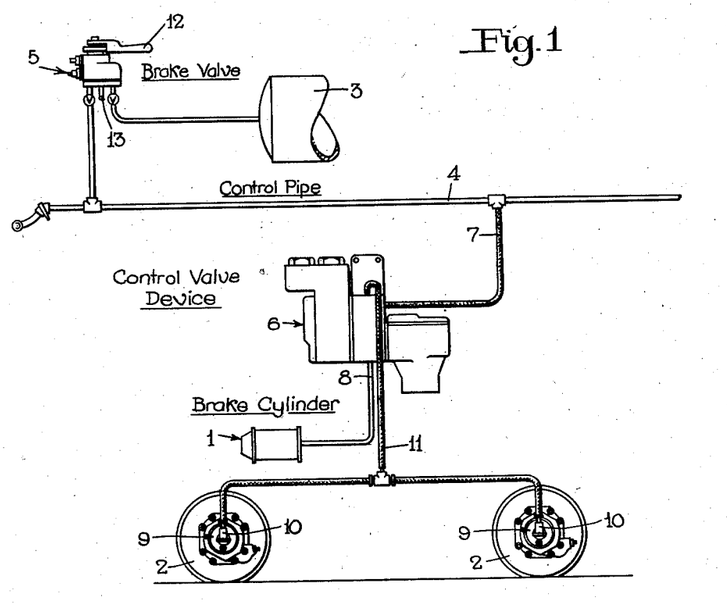
Fig. 1 is a simplified diagrammatic view, showing my improved control valve device and the manner of its use in connection with a fluid pressure brake control apparatus for railway cars and trains.

Referring to Fig. 1, we have illustrated a simplified type of fluid pressure brake system of the so-called "straight-air" type comprising a brake cylinder 1 operative upon the supply of fluid under pressure thereto to effect application of friction brakes to the wheels 2 of a wheel truck. For simplicity, only two wheels 2 are shown, it being understood that each of the wheels 2 shown is one of a pair that may be fixed at opposite ends of a connecting axle.

The brake control equipment further comprises a source of fluid under pressure, such as a reservoir 3, which is normally charged as by a fluid compressor not shown; a control pipe 4; and manually controlled apparatus typified in simplified form by a brake valve 5 of the self-lapping type for controlling the supply of fluid under pressure from the reservoir 3 to the pipe 4 and the release of fluid under pressure from the pipe 4. A control valve device 6 constructed according to my invention, is interposed between the control pipe 4 and the brake cylinder 1, connection being made from the control pipe 4 to the control valve device through a branch pipe 7 of the control pipe and to the brake cylinder 1 through a so-called brake cylinder pipe 8.

Associated with each of the wheel and axle units is a "Decelostat" or wheel-slip detector 9 of the rotary inertia type, each "Decelostat" including a pilot valve device 10 carried on the outer end of the axle journal casing and connected to respective branches of a pipe 11, hereafter called the pilot valve pipe, leading and connected to the control valve device 6.

Considering the parts of the equipment in greater detail, the self-lapping brake valve 5 has an operating handle 12 secured to the outer end of a rotary operating shaft for turning the shaft to control supply and release valve mechanism. In the normal or brake release position of the brake valve handle 12, fluid under pressure is vented to atmosphere from the control pipe 4 by way of the exhaust port and pipe 13 at the brake valve. When the brake valve handle 12 is shifted out of its brake release position into its application zone, the exhaust connection of the control pipe 4 is closed and a supply connection is opened between the reservoir 3 and the control pipe 4. The nature of the brake valve mechanism is such that the supply of fluid under pressure to the control pipe 4 is automatically terminated when a certain pressure is established therein, corresponding substantially to the degree of displacement of the brake valve handle out of its brake release position. Thus, the greater the degree of displacement of the brake valve handle out of its brake release position, the greater is the pressure established in the control pipe 4.

The brake valve 5 also has a pressure-maintaining feature in that should the pressure in the control pipe tend to reduce from that corresponding to the degree of displacement of the brake valve handle out of its brake release position, the supply valve of the brake valve is automatically operated to cause fluid under pressure to be supplied to the control pipe to maintain a pressure therein corresponding to the position of the brake valve handle.

Under normal conditions communication is established, as hereinafter more fully explained, through the control valve device 6 from the branch pipe 7 of the control pipe and the brake cylinder pipe 8 so that a fluid pressure is established in the brake cylinder corresponding to the pressure established in the control pipe 4, thereby causing a corresponding degree of application of the brakes on the car wheels 2.

Figure 2:
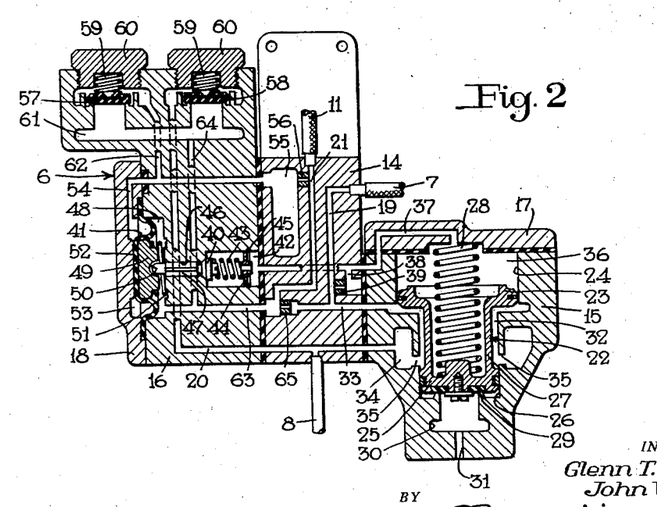
Fig. 2 is an enlarged vertical sectional view, with parts shown in one plane for clarity, showing the details of my improved control valve device.

The control valve device 6 comprises a sectionalized casing including a pipe bracket and mounting section 14 having two substantially parallel faces on opposite sides thereof, to one of which faces a vent valve section 15 is attached and to the other face of which an auxiliary section 16 is attached, as by screws or bolts (not shown) with suitable sealing gaskets intervening. The vent valve section 15 has a cap section 17 attached thereto and the auxiliary section 16 has a cover plate section 18 attached thereto, as by screws or bolts (not shown) with suitable sealing gaskets intervening.

The pipe bracket section 14 is provided with three passages 19, 20 and 21 having ports opening to the exterior of the casing section, to which the branch pipe 7 of the control pipe, the brake cylinder pipe 8, and the pilot valve pipe 11 are respectively connected.

The vent valve section 15 embodies a differential piston valve device 22 comprising an annular piston 23 operative in a cylindrical bore 24 and a disc type piston valve 25, of smaller diameter, operative in a cylindrical bore 26 of correspondingly smaller diameter than the bore 24, the two bores being coaxially related and the piston 23 and the piston valve 25 being connected by a tubular stem 27.

A coil spring 28 within the stem 27 is interposed between the contact face of the cap section 17 and the inner face of the piston valve 25 and yieldingly urges the differential piston valve device 22 downwardly to a position in which the piston valve 25 seats on a seat rib 28 surrounding a chamber 30 that is open to atmosphere through a relatively large exhaust port 31.

An annular chamber 32 is formed in surrounding relation to the stem 27 and is open to the lower face of piston 23. Chamber 32 is connected by a passage 33 to the passage 19, to which the branch pipe 7 of the control pipe 4 is connected.

Also formed in vent valve section 15 is an annular chamber 34 which communicates with the annular chamber 32 through a series of peripherally spaced ports 35. The passage 20, to which the brake cylinder pipe 8 is connected, extends into the vent valve section 15 and opens into chamber 34.

A chamber 36 is formed in the bore 24 above the piston 23, to which fluid under pressure may be supplied and from which fluid under pressure may be released through a passage 37. The passage 37 extends into the pipe bracket section 14 and has a branch passage 38 which is connected to the passage 19 through a suitable bore in which a choke-fitting 39 is secured as by a screw-type connection. The choke-fitting 39 may be installed and removed through the open end of the passage 38 at the face of the pipe bracket section 14 while the vent valve section 15 is removed.

Embodied in the auxiliary section 16 is a poppet valve 40 and a fluid pressure responsive device, in the form of a flexible diaphragm 41, for operating the valve 40. The valve 40 is contained in a chamber 42 that opens to the inner face of the auxiliary section 16 and is connected to the passage 37. A coil spring 43, interposed between the valve 40 and a washer 44 locked in the chamber 42 as by a snap ring 45, yieldingly urges the valve 40 to seated position on a valve seat surrounding a bore 46 through which the fluted stem 47 of the valve extends in guided relation.

The flexible diaphragm 41 is suitably secured as by being clamped along the circular periphery thereof between the cover plate section 18 and the outer face of the auxiliary section 16. Formed at the right of the diaphragm 41 within the auxiliary section 16 is a chamber 48 into which the rounded end of the fluted stem 47 of the valve 40 extends.

Suitably supported or attached at the central portion of the diaphragm 41 is a metallic follower 49 having a spherical recess 50, conforming to the rounded end of the fluted stem 47 of valve 40, in which the end of the stem 47 is received. A coil spring 51, interposed between the follower 49 and the auxiliary section 16, yieldingly urges the central portion of the diaphragm 41 into contact with a projecting boss 52 formed on the inside of the cover plate 18. In this position of the follower 49, there is a slight clearance with respect to the end of the fluted stem 47 to insure proper seating of the valve 40.

Formed at the left of the diaphragm 41 within the cover plate 18 is a chamber 53 that communicates through a passage 54 with a volume chamber 55 formed in the pipe bracket section 14. This volume chamber 55, in turn, communicates through a bore containing a choke-fitting 56 with the passage 21 to which the pilot valve pipe 11 is connected.

Further embodied in the auxiliary section 16 are two disc-type check valves 57 and 58. These check valves, or one-way valves, are identical in construction and each is adapted to be urged into seated relation on a corresponding annular seat rib by a relatively light coil spring 59 interposed between the valve and a recess formed on the inner end of a screw plug 60.

Check valve 57 is adapted to be unseated to enable the supply of fluid under pressure therepast from a chamber 61 to a passage 62 connected to the passage 54 leading to the volume chamber 55 and to the chamber 53 at the left of the diaphragm 41 and is effective to prevent reverse flow of fluid under pressure therepast.

Check valve 58 is adapted to be unseated to enable flow of fluid under pressure therepast from the chamber 61 to the passage 20 and is effective to prevent reverse flow of fluid under pressure therepast.

The chamber 48 at the right of the diaphragm 41 is connected to the chamber 61 by a passage 63 and a branch passage thereof 64.

The end of passage 63 registers with and is connected to the end of the passage 33 in the pipe bracket section 14. The end of passage 33 is suitably enlarged and threaded to receive a screw-type choke-fitting 65 therein when the auxiliary section 16 is removed from the corresponding face of the pipe bracket section 14. Passage 21 is connected to the end of the passage 33, and thus to passage 63, outside the choke-fitting 65.

The "Decelostats" or wheel slip detectors 9 may be of the rotary inertia type disclosed in the copending application, Serial No. 533,284 of Joseph C. McCune and George K. Newell, filed April 29, 1944, now Patent No. 2,447,710, granted August 24, 1948, and assigned to the assignee of the present application. Since reference may be had to such copending application for details of the "Decelostat" it is deemed unnecessary to further describe these devices other than to point out that each comprises essentially a fly-wheel element which is effective to open or unseat a normally closed or seated pilot valve device 10 in response to acceleration or deceleration of the wheel and axle units at a rate exceeding a certain rate, such as ten miles per hour per second, which occurs only when the associated wheel 2 slips.

The term "slip" as used herein refers to the rotation of a vehicle wheel at a speed different from that corresponding to vehicle or rail speed at a given instant and may be induced either by excessive propulsion torque or by excessive braking torque exerted on the wheel. When excessive braking torque is exerted on a wheel it decelerates at an abnormally rapid rate in excess of ten miles per hour per second, which rate of deceleration is never obtained unless the wheel is actually slipping.

The term "slide" as employed herein in connection with vehicle wheels refers to a non-rotative or locked condition of the wheels as distinct from a "slip" condition in which the wheels are rotating.

It will be understood, therefore, that whenever the vehicle wheels 2 begin to slip, the corresponding pilot valve device 10 is unseated to effect a rapid venting to atmosphere and a consequent reduction of the fluid pressure in passages and chambers in the control valve device 6 connected thereto to initiate an operation thereof.

Operation

In order to explain the operation of the control valve device 6, let it be assumed the operator of a train desires to initiate a brake application while the car or train having the brake control equipment shown in Fig. 1 is traveling under power. After first shutting off propulsion power, the operator shifts the brake valve handle 12 out of its brake release position a desired amount into the brake application zone to cause a fluid pressure to be established in the control pipe 4 corresponding to the desired degree of brake application. Concurrently with charging of the control pipe 4, fluid under pressure flows from the pipe 4 through the branch pipe 7, passage 19, passage 33, annular chamber 32, ports 35, annular chamber 34, passage 20 and pipe 8 to the brake cylinder 1, thereby establishing a pressure in the brake cylinder corresponding to that established in the control pipe 4. While fluid under pressure is being supplied to the brake cylinder as just described, fluid under pressure is also being supplied to the control chamber 36 from the passage 19 by way of the restricted orifice in the choke-fitting 39, branch passage 38, and passage 37. The size of the orifice in the choke-fitting 39 is such as to permit a sufficiently rapid build-up of the fluid pressure in chamber 36 with respect to the fluid pressure active in chamber 32 beneath piston 23 that such fluid pressure differential as is exerted on the piston 23 of the differential piston valve device 22 is ineffective to raise the piston valve device in opposition to the force of the spring 28. The piston valve device 22 accordingly remains positioned as shown in Fig. 2 while fluid under pressure is being supplied to the brake cylinder.

While fluid under pressure is being supplied to the brake cylinder, fluid under pressure is also being supplied from the passages 19 and 33 through the restricted orifice in the choke-fitting 65 and passage 63 to charge the chamber 48 to a pressure corresponding to that established in the brake cylinder. At the same time, the chamber 53 at the left of the diaphragm 41 and volume chamber 55 are also charged with fluid under pressure which flows from the passage 63 by way of the passage 64, chamber 61, past the check valve 57 which unseats in response to the higher pressure in chamber 61 active on the inner seated area thereof, and passages 62 and 54.

The pilot valve pipe 11 is also charged simultaneously with the charging of the chamber 48 and the chambers 53 and 55, being connected directly to the passage 63 through the passage 21. In this connection, the choke-fitting 56 has little or no effect insofar as charging of the pilot valve pipe 11 from the volume chamber 55 is concerned.

So long as the wheels 2 do not begin to slip due to the brake application, the parts of the control valve device 6 remain in the positions in which they are shown in Fig. 2 except for the unseating of check valve 57 as previously described. Thus, the fluid pressure in the brake cylinder may be varied in correspondence with variations of the pressure in the control pipe 4 to either increase or decrease the degree of brake application on the wheels 2.

Should one of the wheel units begin to slip during a brake application or when a brake application is first initiated, operation of the control valve device 6 is effected in the manner which will now be described. The unseating or opening of the pilot valve device 10 of the "Decelostat" 9 associated with the slipping wheel unit effects a rapid reduction of the pressure in the chamber 48 at the right of the flexible diaphragm 41 by way of passages 63 and 21, and pipe 11. At the same time a reduction of the pressure in the chamber 53 at the left of the diaphragm 41 is effected at a relatively slower rate by way of the passage 54, volume chamber 55, orifice in the choke-fitting 56, and pipe 11. In this connection it will be understood that the volume of the chamber 55 and the size of the orifice in choke-fitting 56 are so designed as to provide the slower rate of reduction of the pressure in the chamber 53 with respect to that in the chamber 48.

A differential fluid pressure is thus promptly created on the diaphragm 41 sufficient to overcome the opposing force of springs 51 and 43 and shift the diaphragm 41 in a right-hand direction a sufficient amount to unseat the poppet valve 40, the amount of unseating movement of the poppet valve 40 being limited by the engagement of the follower 49 with the casing section 16.

The unseating of the poppet valve 40 establishes a direct connection between the chamber 36 of the vent valve section 15 and the pilot valve pipe 11, this connection being by way of the passage 37, chamber 42, past the unseated valve 40, through the bore 46, chamber 48, and passages 63 and 21.

Due to the rapid reduction of the fluid pressure in the chamber 36 and the relatively slower reduction of the fluid pressure in the annular chamber 32 beneath the piston 23 by reason of the restriction offered by the choke-fitting 65 to direct venting of the chamber 32 to the passage 21 and the connected pilot valve pipe 11, a sufficient fluid pressure differential is promptly built-up effective to exert an upward force on the piston 23 of the piston valve device 22 to overcome the opposing force of the spring 28 and shift the piston 23 upwardly into seated relation on the gasket intervening between the cap section 17 and the vent valve section 15.

In this position of the piston valve device 22, the piston valve 25 is unseated from the annular rib seat 29 to a position above the ports 35, thereby cutting off the connection between the supply passage 19 and the brake cylinder pipe 9 to prevent the further supply of fluid under pressure to the brake cylinder. In this raised position of the differential piston valve device 22, the brake cylinder 1 is thus vented at a rapid rate to atmosphere by way of the brake cylinder pipe 8, passage 20, chamber 34, ports 35, chamber 30 and exhaust port 31.

The pressure in the passage 20 connected to the brake cylinder pipe 8 and active above the check valve 58 reduces concurrently and at a corresponding rate with the reduction of brake cylinder pressure by venting through the exhaust port 31 of the vent valve section 15. At the same time, the pressure of the fluid in the chamber 61 active on the inner seated area of the check valve 58 reduces at a rapid rate by way of the passages 64, 63, 21 and pilot valve pipe 11. Check valve 58 may or may not be unseated, therefore, depending upon the relation of the pressures on opposite sides thereof.

If operating properly, the pilot valve devices 10 of the "Decelostats" will be unseated or opened substantially at the instant the slipping wheel begins to decelerate at a rate exceeding ten miles per hour per second and remain open until the slipping wheel ceases to accelerate, while returning back toward a speed corresponding to vehicle speed, at a rate exceeding ten miles per hour per second. Normally, therefore, the pilot valve pipe 11 will remain vented to atmosphere substantially up to the time that the vehicle wheel is restored to vehicle speed, whereupon the "Decelostat" pilot valve will be reclosed to terminate further venting of the pilot valve pipe.

The volume of the volume chamber 55 and the size of the orifice in the choke-fitting 56 may be so designed and selected as to cause reclosing of the poppet valve 40 either before or after the "Decelostat" pilot valve is closed. If the pressure in the chamber 53 and the volume chamber 55 reduces at a sufficiently rapid rate through the orifice of the choke-fitting 56, while the "Decelostat" pilot valve is open, the fluid pressure differential force acting on the diaphragm 41 may reduce below that required to overcome the force of the springs 51 and 43, whereupon the valve 40 will be reseated notwithstanding the fact that the pilot valve pipe is still being vented past the open "Decelostat" pilot valve.

On the other hand, the volume of the chambers 53 and 55 and the size of the orifice in the choke-fitting 56 may be so designed and selected that the pressure in the chambers 53 and 55 reduces at such a slow rate as to maintain a fluid pressure differential on the diaphragm 41 sufficient to maintain the poppet valve 40 unseated until after the "Decelostat" pilot valve is closed in normal manner of operation.

If the poppet valve 40 remains unseated after the "Decelostat" pilot valve 10 is closed, fluid under pressure will continue to be vented from the chamber 36 of the vent valve section 15 past the poppet valve 40 through the bore 56, chamber 48, passages 63, 64, chamber 61, past the valve 58 which unseats in response to the higher pressure on the inner seated area thereof, and thence through the passage 20, annular chamber 34, ports 35 past the piston valve 25 to atmosphere through the exhaust port 31.

So long as sufficient differential fluid pressure is effective on the diaphragm 41, therefore, to maintain the poppet valve 40 unseated, the differential piston valve device 22 of the vent valve section will remain in its raised position continuing to vent fluid under pressure from the brake cylinder 1.

It will be apparent, therefore, that whether the "Decelostat" pilot valve is closed or open, is immaterial after the differential piston valve device 22 of the vent valve section 15 is actuated to its upper position in which fluid under pressure is vented from the brake cylinder, for the reason that the differential piston valve device 22 is maintained in its venting position only so long as the poppet valve 40 is unseated.

With a given volume for the chambers 53 and 55 and a given size of orifice in the choke-fitting 56, the length of time that the differential piston valve device 22 will be maintained in its venting position, once it is actuated thereto, will vary depending upon the pressure established in the chambers 53 and 55 at the time the "Decelostat" pilot valve is first operated to initiate a reduction of the pressure in the pilot valve pipe 11. In any event, the time that the differential piston valve device 22 is maintained effective to continue the reduction of the pressure in the brake cylinder will be sufficient to insure the return of the slipping wheels back to a speed corresponding to vehicle speed.

It will be apparent that after the poppet valve 40 is reseated in response to the reduction of the pressure in the chambers 53 and 55 through the orifice of the choke-fitting 56, further venting of fluid under pressure from the chamber 36 of the vent valve section 15 is immediately terminated and the pressure therein is promptly built-up through the choke-fitting 39 to cause prompt equalization of the pressures on opposite sides of the piston 23 to thereby render the spring 28 effective to return the piston valve device 22 promptly to its seated position in which it is shown in Fig. 2. Should the "Decelostat" pilot valve 10 remain open after the valve 40 is reseated, fluid under pressure will continue to blow to atmosphere at a restricted rate through choke-fitting 65, pilot valve pipe 11 and past the open pilot valve. Such "blow" will however not interfere with the restoration of the differential piston valve device 22 to its normal position as just described.

When the differential piston valve device 22 is thus restored to its normal position, in which it is shown in Fig. 2, the communication previously described through which fluid under pressure is supplied to the brake cylinder is reestablished and the pressure is again restored in the brake cylinder to a value corresponding to that established in the control pipe 4.

It will be observed that by reason of the pneumatic timing arrangement controlling the poppet valve 40 and correspondingly the differential piston valve device 22, the reduction of the pressure of the brake cylinder is controlled on a time basis rather than on the basis of the actual pressure in the brake cylinder, as heretofore.

In the event that a wheel begins to slip a second time upon reapplication of the brakes by operation of the control valve device 6, the above operation is repeated if the interval between successive slips is sufficient to permit adequate build-up of the pressure in the chamber 53 and the connected volume chamber 55.

When the car or train comes to a full stop, as a result of a brake application in the manner just described, the control valve device 6 will obviously always be restored to its normal condition automatically, either before the car comes to a stop or after the car comes to a stop. In either case, fluid under pressure is always thereby resupplied to the brake cylinder to maintain the application of the brakes while the car or train is stopped. When the operator desires to again start the car or train he may release the brakes simply by restoring the brake valve handle 12 to its normal or brake release position, thereby reducing the pressure in the control pipe 4 and correspondingly in the brake cylinder 1 to atmospheric pressure to effect the complete release of the brakes.

It will be observed that if for any reason the "Decelostat" pilot valve should fail to reclose in proper manner and "stick open," or if the pilot valve pipe 11 should be broken or ruptured by striking an external object during an application of the brakes so as to effect an undesired release of the brakes, reapplication of the brakes will be effected in the usual manner. This will be apparent from the fact that the poppet valve 40 will be reseated in its accustomed manner on a time basis, regardless of the condition of the pilot valve pipe or the "Decelostat" pilot valve. With the pilot valve pipe 11 broken or the "Decelostat" pilot valve stuck open, however, the chambers 48 and 53 and the volume chamber 55 cannot be recharged. Insofar as the operation of the control valve device 6 to prevent actual locking of the wheels is concerned, such characteristic is thereafter lost, until suitable repairs are made. However, since the paramount objective is to insure reapplication of the brakes, protection of the wheels is a secondary consideration under such emergency conditions. A similar situation obtains if the pilot pipe 11 should become broken or ruptured while the brakes are released. In such case, the brakes may be applied and released in normal manner under the control of the operator but the control valve device 6 is not operative to protect against sliding of the wheels.

Figure 3

Figure 3:
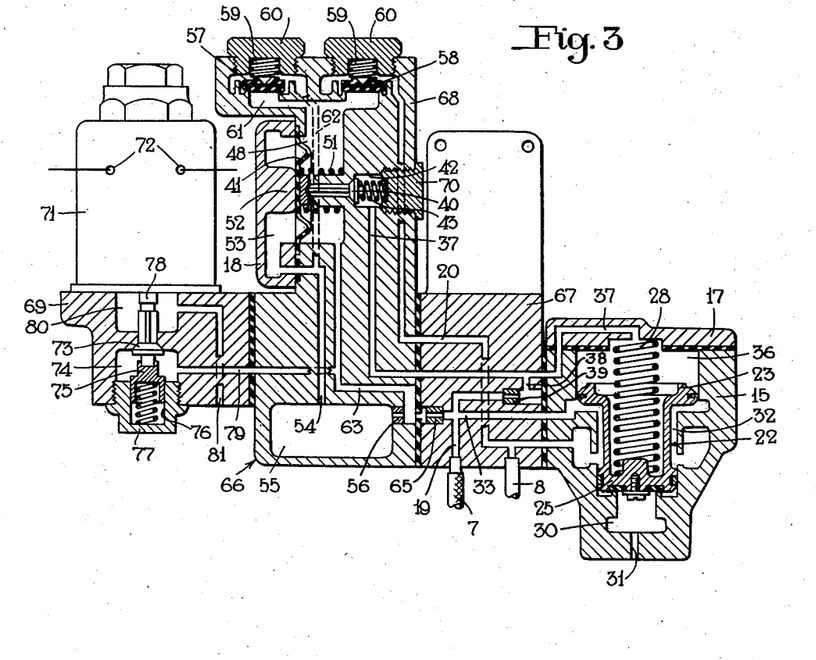
Fig. 3 is a vertical sectional view, showing a modified embodiment of a control valve device adapted for electrical rather than pneumatic control.

Referring to Fig. 3, a modified embodiment of a control valve device, referred to by the general reference character 66, is shown which is adapted for electrical control instead of pneumatic control. Such a control valve device may be employed in exactly the same manner as the control valve device 6 where the "Decelostat" employed, corresponding to the "Decelostat" 9, actuates a switch instead of a valve in response to the slipping condition of the vehicle wheels.

To a large degree the control valve device 66 is similar to the control valve device 6 and therefore, wherever possible, the same reference numerals are employed to identify corresponding parts in the two valve devices.

Essentially, control valve device 66 comprises a sectionalized casing having a pipe bracket and mounting section 67, to the opposite faces of which are connected a vent valve section 15 identical to that in the control valve device 6, and an auxiliary section 68. In addition, a magnet valve section 69 suitably attached as by screws or bolts (not shown) to the outer face of auxiliary section 68 is also provided.

The pipe bracket and mounting section 67 differs from the corresponding section 14 of the control valve device 6 in that the volume chamber 55 and choke-fitting 56 are omitted and no connection is provided for a pilot valve pipe corresponding to the pilot valve pipe 11. The volume chamber 55 and the choke-fitting 56 omitted from the pipe bracket section 67 are, however, provided in the auxiliary section 68, as will be hereinafter more fully described. In other respects, the elements and passages embodied in the pipe bracket section 67 correspond to those in the pipe bracket section 14 of the control valve device 6. Thus it will be seen that the brake cylinder pipe 8 is connected to a port opening out of the passage 20. Similarly, the branch pipe 7 of the control pipe 4 is connected to a port opening out of a passage 19. Passage 19 is connected to a passage 33 that leads to the annular chamber 32 surrounding the stem of the differential piston valve device 22 of the vent valve section 15. Charging of the chamber 36 of the vent valve portion is effected through a choke-fitting 39, and passages 38 and 37 just as in the control valve device 6.

The auxiliary section 68 differs, essentially, from the auxiliary section 16 of the control valve device 6 in that it is adapted to accommodate the volume chamber 55 and choke-fitting 56 therein. In other respects, the elements embodied therein correspond to those of the auxiliary section 16 of the control valve device 6. Thus, it will be seen that the auxiliary section 68 embodies a poppet valve 40 and a flexible diaphragm 41 for operating the valve. Two chambers 48 and 53 on the right-hand and left-hand sides of the diaphragm respectively are similarly provided. In this instance, the chamber 48 is open directly into the chamber 61 immediately beneath the two check valves 57 and 58. Also the coil spring 43 associated with the poppet valve 40 is backed-up by a screw plug 70 screwed into the open end of the bore 42.

The chambers 53 and 55 are connected by a passage 54 having a branch passage 62 leading to the top of the check valve 57. The connection between the volume chamber 55 and the passage 63 is effected through the choke-fitting 56 in the same manner as in the control valve device 6, except for the ommission of the passage 21.

Essentially, therefore, the control valve device 66 differs from the control valve device 6 in having the magnet valve section 69. The magnet valve section 69 embodies a suitable solenoid or magnet winding 71 having two terminals 72 whereby it may be connected in a circuit. The magnet valve section 69 further embodies a valve 73 of the poppet type contained in a chamber 74 and yieldingly biased upwardly to a seated position by a spring-biased follower 74 that is slidable in a suitable recess 76 of a screw plug 77 screwed into the open end of the chamber 74.

Upon energization of the solenoid 71, a plunger 78 is thereby actuated downwardly to effect unseating of the valve 73 by engagement with the upper end of the fluted valve stem.

The valve 73 is effective, when unseated, to establish communication from the chamber 74, to which passage 63 is connected through a passage 79, to a chamber 80 that is constantly connected to atmosphere through an exhaust passage and port 81.

*Operation*

The operation of control valve device 66 should be apparent from previous description of the control valve device 6 and its operation. However, in order to explain more fully the effect of operation of the magnet valve section 69, a brief description of the operation of this control valve device 66 will be given.

Insofar as the charging of the control valve device 66 during a brake application is concerned, the previous description of the charging operation of control valve device 6 should suffice, the only difference being that fluid under pressure is supplied through the passage 79 to the chamber 74 from the passage 63 rather than to the pilot valve pipe 11 as is the case with the control valve device 6.

If a slip condition of the vehicle wheels occurs in the manner assumed in connection with the operation of the control valve device 6, the corresponding "Decelostat" will effect energization of the solenoid 71 when the deceleration of the vehicle wheels during the slip condition exceeds ten miles per hour per second. The valve 73 is thus unseated, in response to energization of the solenoid 71, to effect a reduction of the pressure in the chamber 48 at a rapid rate in the same manner as the "Decelostat" pilot valve operates to vent the chamber 48 of the control valve device 6.

At the same time, the pressure in the chamber 53 and the connected volume chamber 55 is reduced at a relatively slow rate through the choke-fitting 56, passages 63 and 79, past the unseated valve 73, chamber 80 and exhaust passage and port 81.

The differential fluid pressure thus promptly created on the diaphragm 41 is effective to unseat the poppet valve 40, which, in turn, effects the rapid reduction of the pressure in the chamber 36 of the vent valve section 15. In this case, fluid under pressure is vented from the chamber 36 by way of the passage 37, chamber 42, past the unseated valve 40, chamber 48, passages 63 and 79, chamber 74, past the unseated valve 73, chamber 80 and exhaust passage and port 81.

The differential piston valve device 22 of the vent valve section 15 is thus correspondingly and promptly actuated to its upper position in which the piston valve device 25 cuts off the supply of fluid under pressure to the brake cylinder and simultaneously establishes the communication through which fluid under pressure is vented from the brake cylinder by way of the pipe 8, passage 20, past the unseated piston valve 25 to atmosphere through the exhaust port 31.

Just as in the control valve device 6, so in the control valve device 66, the reduction of the pressure in the brake cylinder 1 by operation of the vent valve section 15 continues the reduction of the pressure in the chamber 48 and chambers 53 and 55 past the check valve 58, thereby maintaining the differential fluid pressure on the diaphragm 41 and a consequent unseating of the poppet valve 40, whether the valve 73 remains unseated or reseats.

So long as the poppet valve 40 of the control valve device 66 is unseated, the differential piston valve device 22 of the vent valve section is maintained in its upper position continuing the venting of fluid under pressure from the brake cylinder. The poppet valve 40 is reseated to effect the restoration of the differential piston valve device 22 to its normal position at the expiration of the time required for the pressure in the chamber 53 and connected volume chamber 55 to reduce sufficiently through choke-fitting 56 that the combined forces of the springs 51 and 43 becomes effective to cause reseating of the valve 40.

It will be observed that the vent valve section 15 is controlled responsively to the action of the poppet valve 40 independently of the continued energization of the solenoid 71 and the consequent continued unseating of the poppet valve 73. Thus, if the solenoid 71 is deenergized in response to the cessation of acceleration of the slipping wheel at a rate exceeding ten miles per hour per second as it returns to vehicle speed, the vent valve section 15 may continue to effect a reduction of the pressure in the brake cylinder so long as the poppet valve 40 is unseated.

This control of the vent valve section 15 on a time basis operates advantageously in a manner analogous to that of the control valve device 6 under conditions simulating the rupture of the pilot valve pipe or the sticking open of the "Decelostat" pilot valve. For example, should the "Decelostat" switch controlling the solenoid 71 stick in closed position, thereby causing valve 73 to be stuck correspondingly in open position, control valve device 66 will nevertheless operate automatically to restore the differential piston valve device 22 to its normal position effecting the resupply of fluid under pressure to the brake cylinder on a time basis. Reapplication of the brakes is thus assured notwithstanding a faulty operation of the "Decelostat."

Should the "Decelostat" switch controlling the solenoid 71 fail to operate properly upon the occurrence of a slipping condition of the vehicle wheels with the result that the solenoid 71 fails to operate valve 73, the protection offered by the control valve device 66 against sliding of the wheels will of course be lost, just in the case of a ruptured pilot valve pipe 11, but control of the brakes by the operator will not be interfered with.

Having now described our invention, what we claim as new and desire to secure by Letters Patent, is:

1. The combination of a vent valve device normally in a position establishing a communication through which fluid under pressure may be supplied to a fluid pressure receiving device and operative, in response to a rapid reduction of a control fluid pressure, to a different position closing said communication and establishing a different communication through which fluid under pressure is released from the fluid pressure receiving device, a valve operative to initiate said rapid reduction of the control fluid pressure so as to cause operation of the vent valve device to its said different position, and means effective in cooperation with said vent valve device, while in its said different position, to cause said valve to remain operative to continue the rapid reduction of the control fluid pressure for a certain length of time thereby to maintain said vent valve device in its said different position for a corresponding length of time.

2. The combination of a vent valve device normally in a position establishing a communication through which fluid under pressure may be supplied to a fluid pressure receiving device and operative in response to a rapid reduction of a control fluid pressure, to a different position in which the said supply communication is closed and an exhaust communication is established through which fluid under pressure is vented from the fluid pressure receiving device, a piloting communication chargeable with fluid under pressure and adapted to have the pressure therein reduced, a fluid pressure controlled valve operative in response to a reduction of the pressure in said piloting communication for effecting said rapid reduction of the control fluid pressure for the vent valve device through said piloting communication to cause operation of the vent valve device to its said different position, and means rendering the vent valve device effective in its said different position to cooperate with said fluid pressure operated valve in a manner to continue the rapid reduction of the control fluid pressure for a certain length of time independently of the piloting communication.

3. The combination of a vent valve device normally in a position establishing a communication through which fluid under pressure may be supplied to a fluid pressure receiving device and operative, in response to a rapid reduction of a control fluid pressure, to a different position in which the said supply communication is closed and an exhaust communication is established through which fluid under pressure is vented from the fluid pressure receiving device, a piloting communication chargeable with fluid under pressure and adapted to have the pressure therein reduced, a fluid pressure controlled valve operative in response to a reduction of the pressure in said piloting communication for effecting said rapid reduction of the control fluid pressure for the vent valve device through said piloting communication to cause operation of the vent valve device to its said different position, means rendering said vent valve device effective in cooperation with said fluid pressure operated valve to continue the rapid reduction of the control fluid pressure for said vent valve device independently of the piloting communication, and means controlling the operation of the said fluid pressure operated valve in a manner to cause it to terminate the rapid reduction of the control fluid pressure for the vent valve device upon the expiration of a certain length of time whereby to effect the return of the vent valve device to its normal position.

4. The combination of a vent valve device normally in a position establishing a communication through which fluid under pressure may be supplied to a fluid pressure receiving device and operative, in response to a rapid reduction of a control fluid pressure, to a different position closing said supply communication and establishing an exhaust communication through which fluid under pressure is vented from the fluid pressure receiving device, a piloting communication chargeable with fluid under pressure upon the supply of fluid under pressure to the fluid pressure receiving device, a first chamber and a second chamber both chargeable with fluid under pressure upon the supply of fluid under pressure to the fluid pressure receiving device, fluid pressure responsive means subject in opposing relation to the pressures established in said first and said second chambers, means relating said piloting communication to said first and said second chambers in such a manner that, upon a rapid reduction of the pressure in said piloting communication, the pressure in said first chamber reduces at a relatively rapid rate while the pressure in said second chamber reduces at a relatively slow rate, a valve operative by said fluid pressure responsive means in response to the development of a predetermined fluid pressure differential thereon responsive to the reduction of the pressure in the piloting communication for effecting a rapid reduction of the control fluid pressure for the vent valve device by way of the piloting communication to cause operation of the vent valve device to its said different position, and a check valve device so arranged as to render said vent valve device effective in its said different position to continue the reduction of the pressures in said first and said second chambers independently of said piloting communication, said valve being maintained effective to continue the rapid reduction of the control fluid pressure for said vent valve device so long as a predetermined differential exists between the pressures in said first and said second chambers.

5. The combination of a vent valve device normally in a position establishing a communication through which fluid under pressure may be supplied to a fluid pressure receiving device and operative, in response to a rapid reduction of a control fluid pressure, to a different position closing said supply communication and establishing an exhaust communication through which fluid under pressure is vented from the fluid pressure receiving device, a piloting communication chargeable with fluid under pressure upon the supply of fluid under pressure to the fluid pressure receiving device, a normally closed valve effective when open to effect said rapid reduction of the control fluid pressure for said vent valve device, fluid pressure responsive means subject on one side to the fluid pressure in said piloting communication and on the opposite side to the pressure of fluid in a chamber, a first check valve so arranged as to enable charging of said chamber at a rapid rate concurrently with the charging of said piloting communication and to prevent reverse flow of fluid under pressure therepast, means effective, upon a rapid reduction of the pressure in the piloting communication, to cause reduction of the pressure in said chamber at a rate which is relatively slow compared to that of the reduction of the pressure on the said one side of the fluid pressure responsive means whereby to cause at least a certain fluid pressure differential force to become active on the fluid pressure responsive means effective to cause opening of said valve to initiate the rapid reduction of the control fluid pressure for the vent valve device by way of the piloting communication, a second check valve so arranged as to be effective while the vent valve device is in its said different position to cause continuation of the reduction of the pressures at said one side of said fluid pressure responsive means and in said chamber at the rapid and relatively slow rates respectively under the control of the vent valve device independently of the reduction or non-reduction through the piloting communication whereby to maintain at least said certain fluid pressure differential active on the fluid pressure responsive means for a certain length of time.

6. The combination of a vent valve device normally in a position establishing a communication through which fluid under pressure may be supplied to a fluid pressure receiving device and operative, in response to a rapid reduction of a control fluid pressure, to a different position closing said supply communication and establishing an exhaust communication through which fluid under pressure is vented from the fluid pressure receiving device, a piloting communication chargeable with fluid under pressure upon the supply of fluid under pressure to the fluid pressure receiving device, a normally closed valve effective when open to effect said rapid reduction of the control fluid pressure for said vent valve device, fluid pressure responsive means subject on one side to the fluid pressure in a first chamber and on the opposite side to the fluid pressure in a second chamber, means for charging said first and said second chambers concurrently with said piloting communication, means effective, upon a rapid reduction of the pressure in the piloting communication, to cause reduction of the pressure in the said first chamber at a rate corresponding to the rate of reduction in the piloting communication and reduction of the pressure in the said second chamber at a relatively slow rate whereby to cause at least a certain fluid pressure differential force to become active on the fluid pressure responsive means effective to cause opening of said valve, and a check valve so arranged as to be effective while the vent valve device in its said different position to cause a continuation of the reduction of the pressure in said first chamber at a rapid rate and of the reduction of the pressure in said second chamber at a relatively slow rate under the control of the vent valve device independently of the said piloting communication, thereby to maintain said valve open for that length of time required to effect the reduction of the fluid pressure differential force on said fluid pressure responsive means to below said certain value.

7. The combination of a vent valve device having a normal position in which it establishes a communication through which fluid under pressure may be supplied to a fluid pressure receiving device and operative, in response to a rapid reduction of a control fluid pressure, to a different position in which it closes said supply communication and establishes an exhaust communication through which fluid under pressure is vented from said fluid pressure receiving device, a first chamber, a second chamber, means for charging said chambers concurrently with the supply of fluid under pressure to the fluid pressure receiving device, fluid pressure responsive means subject in opposing relation to the pressures established in said first and said second chambers, a magnet valve device operative to effect a rapid reduction of the pressure in said first chamber, means providing a restricted communication between said first and said second chambers whereby the pressure in said second chamber is reduced at a relatively slow rate concurrently with the rapid reduction of the pressure in said first chamber, a normally closed valve operative by said fluid pressure responsive means to an open position, upon the creation of at least a certain fluid pressure differential resulting from the reduction of the pressures in said first and said second chambers, for effecting a rapid reduction of the control fluid pressure for said vent valve device, and check valve means so arranged as to render said vent valve device effective in its said different position to continue the reduction of the pressures in said first and said second chambers at the rapid rate and relatively slow rate respectively independently of said magnet valve device, thereby to maintain said valve in open position for such time as is required to effect reduction of the fluid pressure differential on said fluid pressure responsive means to below said certain differential.

8. A control valve device comprising a pipe bracket section, a vent valve section, an auxiliary section, and a magnet valve section assembled as a unit, a vent valve device contained in said vent valve section and normally in a position establishing a communication through which fluid under pressure may be supplied from a source of supply to a fluid pressure receiving device and operative, in response to a rapid reduction of a control fluid pressure, to a different position closing said supply communication and establishing an exhaust communication through which fluid under pressure is vented from the fluid pressure receiving device, a first chamber and a second chamber in said auxiliary section, means for causing charging of both said first and said second chambers concurrently with the supply of fluid under pressure to the fluid pressure receiving device, a fluid pressure responsive means subject in opposing relation to the pressures in said first and second chambers, a normally closed valve in said auxiliary section operative to an open position to effect the rapid reduction of the control fluid pressure for said vent valve device in response to the creation of at least a certain differential between the pressures in said first and said second chambers, a magnet valve device in said magnet valve section operative to effect a rapid reduction of the pressure in said first chamber, means providing a restricted communication between said second chamber and said first chamber whereby to effect a reduction of the pressure in said second chamber at a relatively slow rate concurrently with the rapid reduction of the pressure in said first chamber by operation of said magnet valve device thereby to create said certain differential fluid pressure on said fluid pressure responsive means effective to open said valve, and check valve means in said auxiliary section so arranged as to render the vent valve device effective while in its said different position to continue the reduction of the pressures in said first and said second chambers at said rapid and said relatively slow rate respectively independently of said magnet valve device, said valve being restored to closed position to effect restoration of the vent valve device to its normal position upon the expiration of a certain time required to effect the reduction of the fluid pressure differential on said fluid pressure responsive means to below said certain differential.

GLENN T. McCLURE.
JOHN W. RUSH.

REFERENCES CITED

The following references are of record in the file of this patent:

UNITED STATES PATENTS

| Number | Name | Date |
|---|---|---|
| 2,198,032 | Farmer | Apr. 23, 1940 |